(12) United States Patent
Smith

(10) Patent No.: US 7,654,229 B2
(45) Date of Patent: Feb. 2, 2010

(54) BOVINE TREADMILL

(76) Inventor: Arlan R. Smith, 14021 Country Way, McCall, ID (US) 83638

( * ) Notice: Subject to any disclaimer, the term of this patent is extended or adjusted under 35 U.S.C. 154(b) by 0 days.

(21) Appl. No.: 11/750,533

(22) Filed: May 18, 2007

(65) Prior Publication Data

US 2008/0287266 A1 Nov. 20, 2008

(51) Int. Cl.
*A01D 15/00* (2006.01)
(52) U.S. Cl. .............. 119/700; 119/14.04; 119/702; 119/703; 119/712; 482/54; 482/51
(58) Field of Classification Search ............ 119/700, 119/14.04, 702, 703, 712; D30/160; 482/54, 482/51
See application file for complete search history.

(56) References Cited

U.S. PATENT DOCUMENTS

| | | |
|---|---|---|
| 3,709,197 A | 1/1973 | Moseley |
| 3,952,704 A | 4/1976 | Webb |
| 3,994,261 A | 11/1976 | Wedell et al. |
| 4,074,657 A | 2/1978 | Senior et al. |
| 4,095,561 A | 6/1978 | Ruetenik |
| 4,205,628 A | 6/1980 | Null |
| 4,227,487 A | 10/1980 | Davis |
| 4,232,630 A | 11/1980 | Orlowski et al. |
| 4,332,217 A | 6/1982 | Davis |
| 4,361,115 A | 11/1982 | Pike |
| 4,389,047 A * | 6/1983 | Hall ............................... 482/2 |
| 4,819,583 A | 4/1989 | Guerra |
| 5,002,015 A | 3/1991 | Sampson et al. |
| 5,100,127 A | 3/1992 | Melnick |
| 5,114,390 A | 5/1992 | Tribelhorn, Jr. |
| 5,277,150 A | 1/1994 | Rhodes |
| 5,542,525 A * | 8/1996 | Kornely ....................... 198/495 |
| 6,058,888 A | 5/2000 | Nichols |
| 6,071,354 A * | 6/2000 | Williams ........................ 134/6 |
| 6,347,603 B1 | 2/2002 | Felger |
| 6,722,316 B1 | 4/2004 | Joycey et al. |
| 6,837,186 B1 | 1/2005 | Terao |
| 6,971,503 B2 * | 12/2005 | Thompson ................... 198/494 |
| 2002/0045519 A1 * | 4/2002 | Watterson et al. ............. 482/54 |
| 2004/0134445 A1 * | 7/2004 | Lindvall ...................... 119/700 |
| 2006/0219524 A1 * | 10/2006 | Kelly et al. .................. 198/495 |
| 2007/0204801 A1 * | 9/2007 | Davies ........................ 119/712 |

* cited by examiner

*Primary Examiner*—Andrea M Valenti
(74) *Attorney, Agent, or Firm*—Robert L. Shaver; Dykas, Shaver & Nipper, LLP

(57) ABSTRACT

A treadmill-like device for exercising large animals such as dairy cows. The large animal exercising device includes a hoof abrasion system and treadmill cleaning or flushing system. The exercise device of the invention can also include a cow identification reader for recovering information off of a data storage or identification device attached to the cow, with such information potentially including exercise pace and duration as well as animal routing information after an exercise session is completed.

11 Claims, 3 Drawing Sheets

BOVINE TREADMILL

FIELD OF THE INVENTION

The present invention generally relates to an apparatus for exercising large animals, and more particularly to a treadmill type device for exercising bovine animals.

BACKGROUND OF THE INVENTION

When people exercise they "feel better" and have improved health on a multitude of levels. Studies show exercise reduces heart attacks, lowers cholesterol, improves circulation, strengthens bones, strengthens the immune system, and provides a host of other benefits for people that are too numerous to list.

The applicant, being a veterinarian working with dairy cows, believes that exercise in dairy cattle would have the same salutary effects for the same reasons as those shown in humans. Just like in humans, improved health in cattle will reduce health care costs by improving the health of every bodily system, and also increase their useful output. Both of these are economic benefits that translate to increased profits for dairy farmers. These are benefits that farmers can easily understand and would, therefore, readily adopt. The benefits of health and exercise to cattle are similar to the benefits for humans, and thus the adoption of exercise could make an immediate and positive impact in agricultural output throughout the developed world.

When working as a large animal veterinarian in the Wisconsin State Department of Agriculture, the applicant witnessed firsthand the benefits of exercise in dairy cattle and heard similar stories from other veterinarians from across the United States. The applicant believes the benefits of exercise are so great that positive results will be found almost immediately and that this approach is simple enough to create a great deal of interest throughout the dairy industry. Since dairy cows often don't have walking lanes available for exercise by walking, what is needed is a device which can be used for exercise by dairy cows which can be used in a relatively confined space, such as a treadmill with certain specialized features.

Such a device would have immediate impacts on such bovine problems as those listed below:
1. Lame cow syndrome.
2. Calving problems.
3. Digestive upsets.
4. Misplaced abomasum.
5. Longer life span in milking parlor.
6. Infertility.

Lame cow syndrome is from excess hoof growth, and could be prevented by adequate hoof abrasion or walking. Other benefits would also result, such as less stress for cows, which should result in more milk produced. Also, healthier cows are likely to produce healthier milk.

On western ranches, where more land can be available for cows, cattle feed is often put at least ½ mile from the cattle their drinking water, because it is believed to result is fewer calving problems. This is due to the positive health effects of walking, which may be caused in part by the fact that walking movement massages the entire bovine digestive tract. This assertion is confirmed by comparing health of dairy cattle to beef cattle. The latter walk as they graze and it has been shown they have fewer health problems than dairy cattle.

It is likely that a healthier cow will live longer and be more productive, and a healthier cow is likely to have fewer fertility problems.

SUMMARY OF THE INVENTION

The purpose of the foregoing Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

The invention is a bovine exercise device. This device provides exercise as well as hoof conditioning to bovine animals. The device includes a device frame which supports a rotating endless track. The outer surface of the endless track includes a surface which is configured for controlled hoof abrasion as the animal walks on the abrasive track. The endless track is supported by a track supporting structure which is attached to the frame. The exercise device includes a drive system for rotating the endless track on the track support structure. The drive system can be a motor, as in a human treadmill, or it can also be powered by the weight and walking energy of a bovine, typically a dairy cow.

The hoof abrasion system can be made up of a roughened abrasive surface on the endless track. One example of such an abrasive surface is a track which includes sections made of expanded metal, in which a rough edge of metal is formed with the points facing upward. As a cow walked on the expanded metal surface of the track its hooves would be abraded as it walks.

The hoof abrasion system can also be achieved by a number of sharp projections which are attached to the surface of the endless track. The hoof abrasion system can also be made of a roughened surface which is similar in texture to a very coarse sand paper applied to a continuous belt.

The exercise device of the invention also includes a track cleaning or flushing system. As the dairy cow walked on the exercise device it would inevitably urinate and defecate while walking walking, as cows normally do. This waste material tends to clog the endless track and the track's drive system, and cover the hoof abrasion system in whatever form that takes. In order to maintain the proper operation of the treadmill and hoof abrasion characteristic of the device, a built in track flushing or brushing system is incorporated into the device. This cleaning system could be intermittent, and would give the operator control over the degree of abrasion available.

The track flushing system can be composed of one or more water sprays on the underside of the track. The water sprays would be used either continuously or periodically to soften waste material and dislodge it from the belt. Below the track flushing system, a waste collection basin would collect the waste material as it dropped from the belt. The collection basin also includes a means for removing the water for further processing The built in track flushing system can also include stationary or rotating brushes which brush against the underside of the track and dislodge waste material. The brushes can be utilized alone or in conjunction with a water spray. Brushes can be bristled brushes, or brush assemblies with rubber fingers that dislodge material from the endless track.

Another type of built in track flushing system is embodied in a form of the device in which the endless track is made up of solid plates which are hinged on one edge. As the solid plates rotate around the end of the endless track, the hinged plates may swing and strike a part of the device frame which tends to dislodge waste material from the hoof abrasion system.

One embodiment of the bovine exercise device includes a power generation system, in which the energy of the walking dairy cow not only powers the rotation of the endless track, but also powers a generating system for electricity, in which electricity generated by one or more walking dairy cows is used directly for power, or is stored for later use or fed into the electrical grid for credits for power that the dairy operation may use at a different time.

An optional feature of the bovine exercise device is a trip reader with the capability of reading electronic ID chips. Electronic ID chips are currently attached to cows in dairy operations so that information specific to each cow can be used in different parts of the operation. One application of the information on the ID chip being used is for identifying a cow so that an automatic milking machine can configure its milking units to match the geometry of an individual cow's teats. In the bovine exercise device which includes an electronic ID chip reader, a computing means and a data base would be associated with the device, with information in the data base on each cow. The data base would contain records of the animal's identification and exercise history, for instance. The data base could also include information about a particular animal's destination, exercise history and a recommended pace and duration for walking.

The bovine exercise device would typically include a gate at the front of the device which would block a cow from exiting through the forward end of the device. When the exercise period for the animal was completed, the front gate would open either by lowering or by swinging to one side to allow the animal to pass through the gate. When exiting, an optional feature of the bovine exercise device is a gate which opens to direct a cow into a chosen location. For instance, certain cows may be identified with need for an examination by a veterinarian. When the particular cow's exercise period was over, the gate would open and the animal would be allowed to leave the exercise device and would enter a holding pen away from the other cows until a veterinarian was able to examine the cow. While the animal was in the veterinary holding pen, other cows would be able to use the exercise device and exit the device into other holding areas or passages into the barn or corral. A gate would also be available at the rear of the machine to prevent entry of multiple of cows on the treadmill.

Still other features and advantages of the present invention will become readily apparent to those skilled in this art from the following detailed description describing preferred embodiments of the invention, simply by way of illustration of the best mode contemplated by carrying out the invention. As will be realized, the invention is capable of modification in various obvious respects all without departing from the invention. Accordingly, the drawings and description of the preferred embodiments are to be regarded as illustrative in nature, and not as restrictive in nature.

DESCRIPTION OF THE PREFERRED EMBODIMENTS

Figure 1:
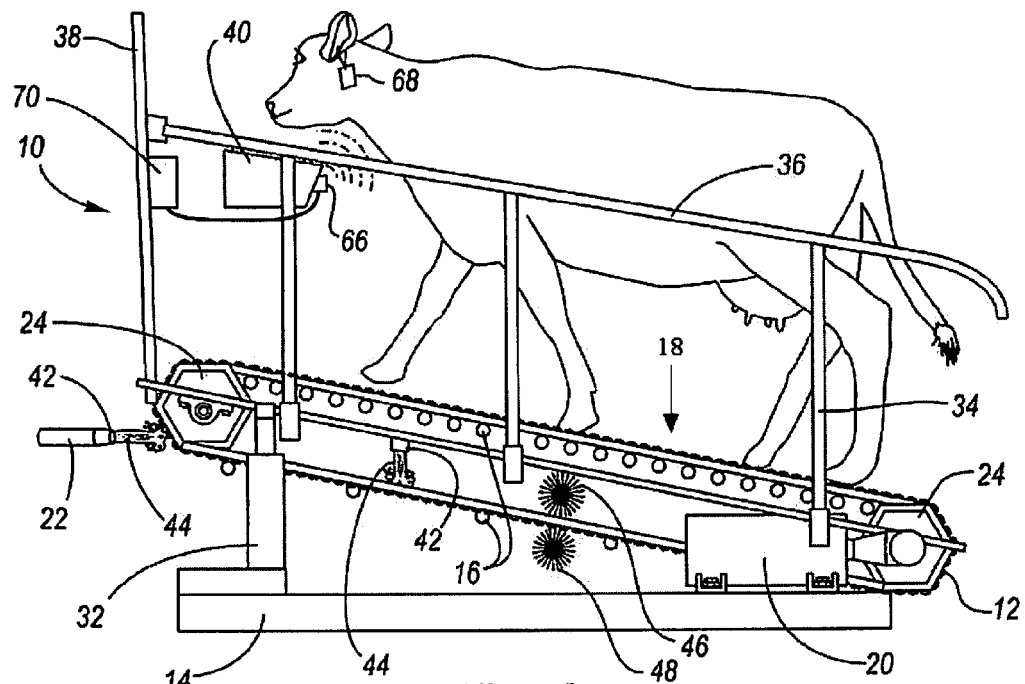
FIG. 1 is a side view of the exercise device of the invention, showing an endless track made of connected sections of rigid metal which are linked together to allow the rigid sections to rotate around the opposite ends of the drive mechanism.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

One or more preferred embodiments are shown in the figures. FIG. 1 is a side view of the bovine exercise device of the invention, showing the device itself as 10, an endless track 12, a frame 14, and a track supporting structure 16, a hoof abrasion system 18, a drive system 20, a track flushing system 22. The endless track 12 can be made of a flexible material which travels around polygonal end rollers 24. If a flexible material is used for the endless track 12, the hoof abrasion system would include abrasive particles embedded in the matrix of the flexible endless track. These abrasive particles could be pieces of garnet, walnut or other shells, manufactured grit of a chosen size, natural grit or other abrasive particles.

Figure 2:
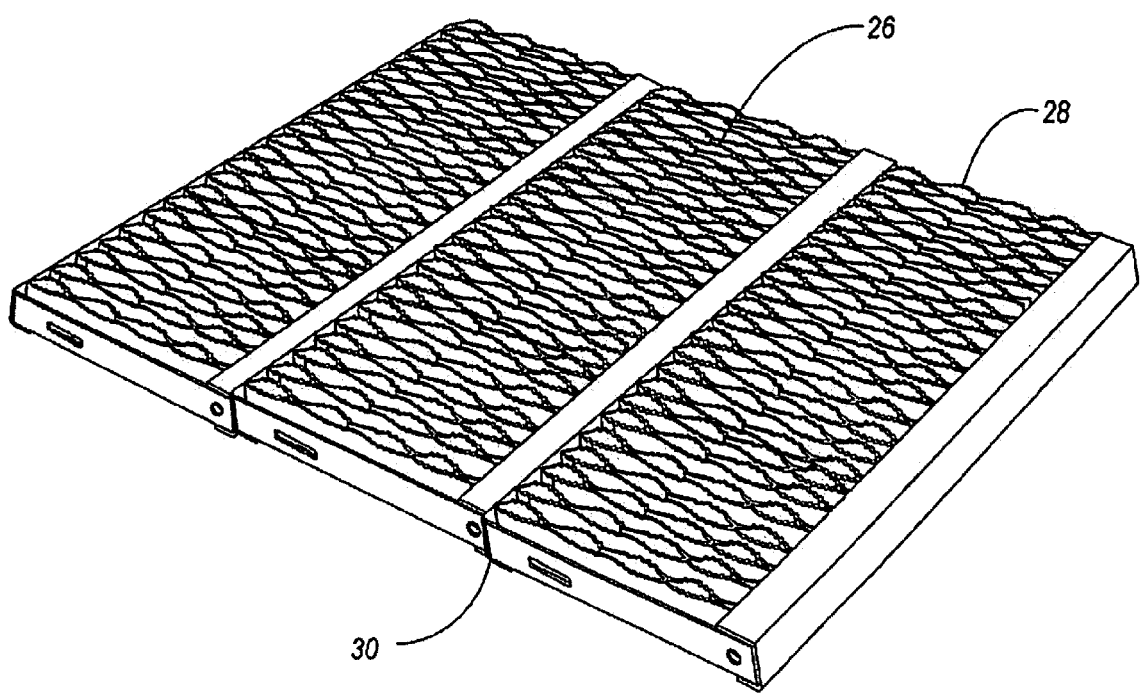
FIG. 2 is a perspective view of one type of endless plate of the invention.

FIG. 1 shows a version of the endless track in which the endless track is made of a number of rigid plates 26. In FIG. 2 the rigid plates are made of expanded metal 28, and joined to each other at adjoining edges by a hinge 30. When the device is fabricated in this particular configuration, the edges of the expanded metal 28 serve as the hoof abrasion system, and wear the hoof down as the animal is walking on the plates. This style of endless track is also advantageous because it is built with holes in the endless track which facilitates cleaning of animal waste from the endless track.

The bovine exercise device 10 as shown in FIG. 1 includes a frame 14 which provides support for the rest of the structure. As in other exercise devices, the angle of the endless track can be adjusted using a height adjuster 32, which can be a pair of hydraulic rams, an electrically powered screw, or other suitable means. The angle of the device can be adjusted at the front or the rear of the machine, depending on the preference of the particular installation. The frame 14 includes upright bars 34 and guide rails 36. These structures serve to define the area for the cow to walk, and prevents the cow from stepping off the side. A front gate 38 prevents the cow from walking off the exercise device towards the front. To release the cow from the exercise device, the front gate 38 would typically be lowered or swung to the side to an open position to allow the cow to walk forward off of the exercise device. Also shown is a food bin 40 which is an option for initially training a cow to use the treadmill, and can also be used to administer medicines or food as an incentive for the continued exercise of the cow. Optionally, the food bin 40 can be used as a container for water for the cow, or include an area for both food and water. A preferred feature of the device is for the angle of the endless track to return to a nominal slightly inclined level position after one cow exits and before another cow enters the device. After the new cow began walking, the angle would be adjusted slowly to match the needs of the new cow during the exercise period. A rear gate is also preferred, to prevent a cow from backing off the treadmill.

The track flushing system of the invention is shown in FIG. 1 as spray nozzles 42 which spray a water stream 44 onto or through the surface of the endless track 12. As the cow walks, it periodically releases waste, which would tend to accumulate or be pressed into any openings in the endless track 12, and also between any abrasive features of the hoof abrasion system 18. If enough waste were present, a significant amount of weight would be added to the endless track, the workings of the treadmill could be obstructed, and the hoof abrasion system 18 could be defeated by the accumulation. Thus, a track flushing system 22 is provided to spray part of the endless track 12 in order to dislodge animal waste and to keep the hoof abrasion system functioning. Spray nozzles 42 are shown at the front edge of the track, on end roller 24, and could also be positioned to direct the water stream 44 through the track such as from inside the track toward the outside. The track flushing system can also include or be comprised of one or more cleaning brushes 48, as shown in FIG. 1.

The frame includes track supporting structures 16 which would typically be rollers, but could also be supporting plates, which support the endless track under the weight of the cow, and which support the endless track underneath the exercise device 10 as it travels backwards towards the rear end of the cow. The preferred embodiment of the device includes a safety measure that detects when a cow has fallen down, which would stop the endless track from further rotation. The cow down condition would be detected by a leash with a pull sensor, or a wireless sensor that would detect the cow's proximity to the endless track. When the cow was determined to be down, a stop such as a brake or a ratchet gear on the front of the endless track would prevent the continued rotation of the endless track.

Figure 3:
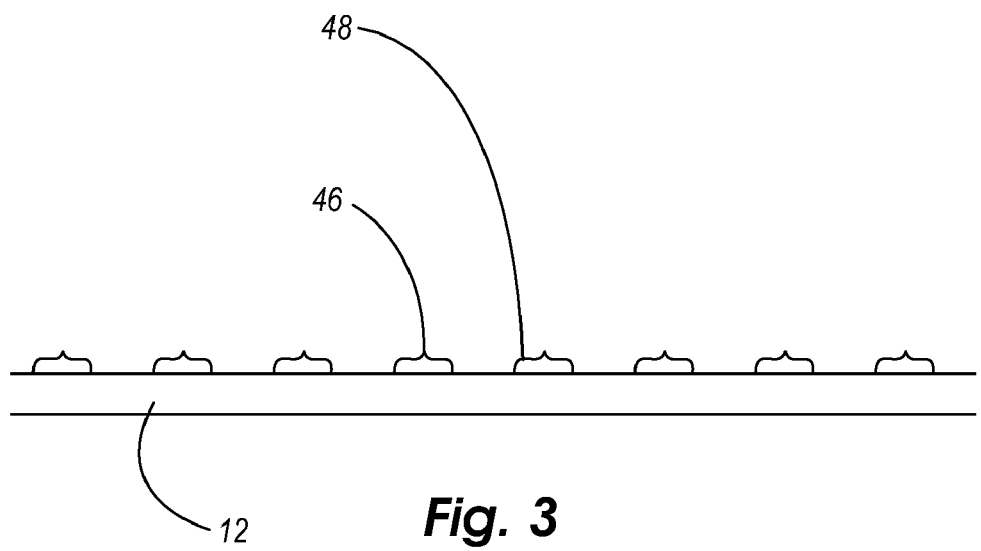
FIG. 3 is a side cross sectional view of one embodiment of the hoof abrasion of the invention.
Figure 4:
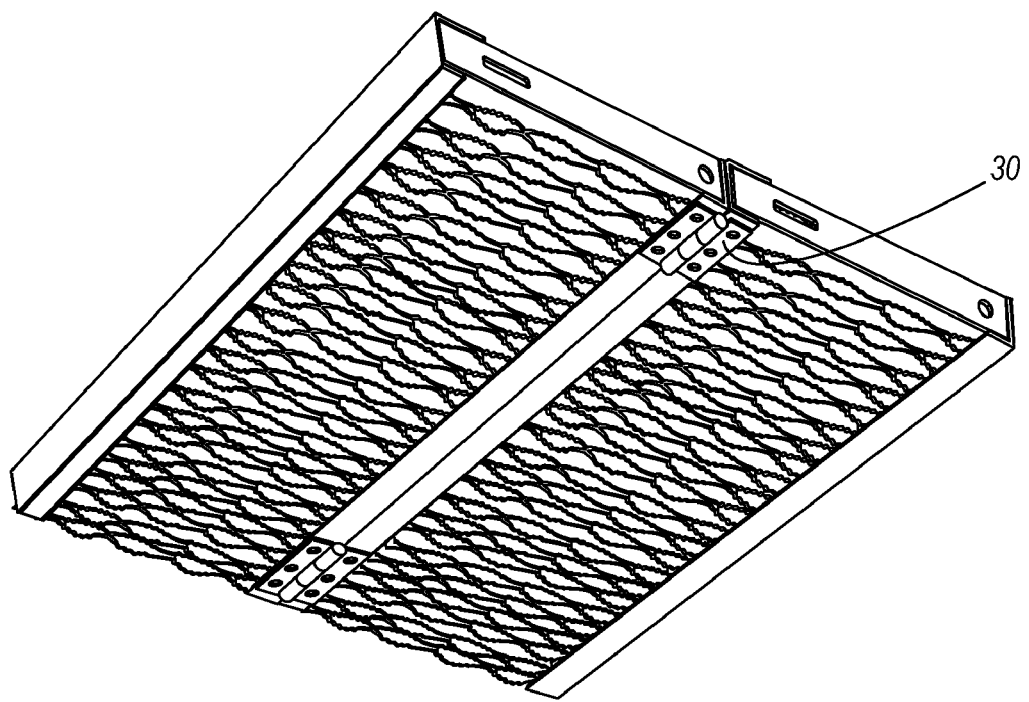
FIG. 4 is a perspective view of the underside of the plates which make up one embodiment of the hoof abrasions system of the invention.

Another option for the hoof abrasion system is to have a generally flat plate to which abrasive projections 46 are added, as shown in FIG. 3. FIG. 4 is a view of the track shown in FIG. 2 which shows the underside of the expanded metal rigid plates of this form of endless track.

Figure 5:
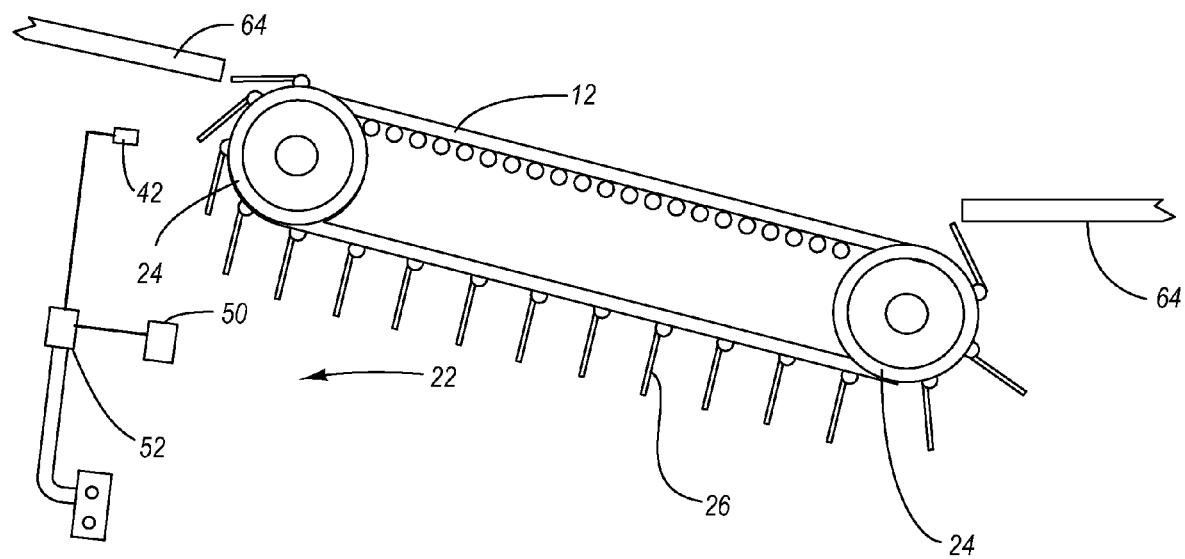
FIG. 5 is a side view of one embodiment of the endless track.

FIG. 5 shows a side view of another preferred embodiment of the device. In this device the rigid plates 26 of the invention are hinged to fall away from the end rollers 24 as the endless track 12 rotates around the end rollers 24. When the rigid plates 26 fall away from the endless track 12, animal waste is more easily removed by spray nozzle 42, and waste removal is assisted by gravity. The track flushing system 22 shown in FIG. 5 includes a water supply 50, and electric solenoid 52 and electronic controller 54. The electronic controller 54 controls the frequency and duration of back wash operations to the treadmill. Also shown in FIG. 5 is a walkway 64, which is a solid structure that an exercising animal can step off of when entering the device or step onto when exiting the treadmill surface. Preferably the step down from the walkway 64 to the endless track 12 is six inches or less.

Figure 6:
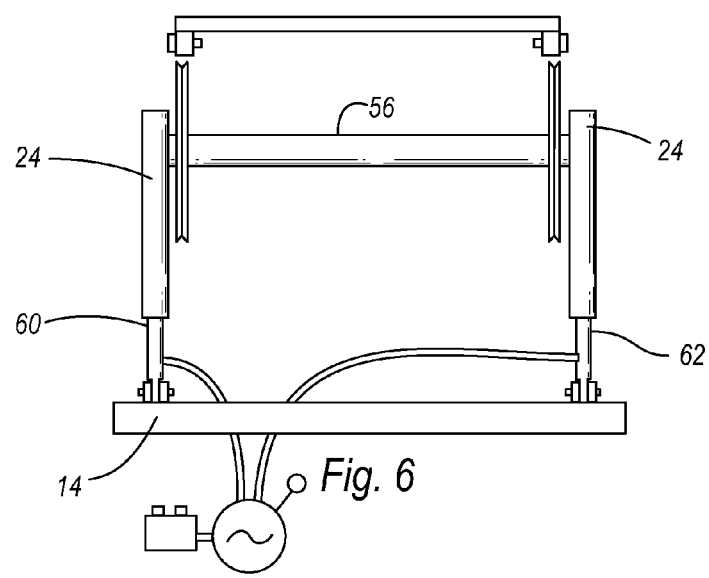
FIG. 6 is an end view of one version of the device of the invention.

FIG. 6 shows a preferred support structure for supporting the rear of the tread. FIG. 6 shows an axle 56 between the end rollers 24 around which the endless track rotates. A wheel 58 at the rear of the treadmill is provided. A left hydraulic cylinder 60 and a right hydraulic cylinder 62 are provided and attached to the frame 14. The left and right hydraulic cylinders 60 and 62 are provided to raise and lower the rear end of the treadmill. Changing the angle of the treadmill changes the amount of work that is performed by the exercising animal. Alternatively, the angle of the endless track surface can also be adjusted by height adjusters 32 at the front or the rear of the device. A pressure tank 72 and a compressor is also shown as part of the hydraulic system shown in FIG. 6.

One optional configuration of the bovine exercise device is one in which the energy of the walking cow is utilized to cause the endless track to rotate. In such a system the energy exerted to walk can also be partially recovered by the use of an electricity generating system. Electricity derived from the walking motion of the animal can be stored in a battery, or fed into the electrical system grid for credits, or can be used to power electrical equipment in a dairy operation.

The exercise device of the invention can include an identification system 66 for identifying an individual animal on the exercise device. The identification system 66 can operate in conjunction with identifying media 68 of various kinds. For instance, each individual cow may be fitted with an electronic chip, which the identification 66 would identify, and read information from a database 70. The database 70 can include information about the specifics of the animal such as name, number, health history, past workout experience, pace and duration of workout, and the need to route the animal to a separate holding pen after exercise. The identification media 68 can also include an identification in the form of a bar code or include information which is optically scanned.

While there is shown and described the present preferred embodiment of the invention, it is to be distinctly understood that this invention is not limited thereto, but may be variously embodied to practice within the scope of the following claims. From the foregoing description, it will be apparent that various changes may be made without departing from the spirit and scope of the invention as defined by the following claims.

What is claimed is:

1. A bovine exercise device for providing exercise and hoof conditioning a bovine animal, comprising:

a device frame supporting a rotating endless track, a set of polygonal shaped rollers, wherein said endless track is configured for rotation around said rollers and comprises a series of rigid plates, wherein each of said rigid plates comprising a series of vertical metal members, wherein said vertical metal members comprise a rough sharp edge pointing away from a track supporting structure, wherein said vertical metal members define a series of holes in said rigid plates, wherein said holes are configured to facilitate cleaning of bovine waste from said endless track by allowing said bovine waste to fall through said endless track, wherein said rigid plates are hingedly connected to form said endless track, wherein said track supporting structure is attached to said frame, wherein said track supporting structure is configured for providing support to said endless track; a hoof abrasion system for causing abrasion of hooves of a bovine animal at a controlled rate when a bovine animal is exercising on said bovine exercising device, wherein said hoof abrasion system comprises said rough edges of said vertical metal members of said rigid plates, wherein said rough edges are configured for abrasion of hooves of a bovine animal when a bovine animal exercises on said bovine exercise device; a water spray system configured to spray water onto said endless track, wherein said water spray system is configured to spray water on said endless track for the purpose of controlling hoof abrasion by softening bovine excrement for controlled exposure of said rough edges of said vertical metal members of said rigid plates; and a drive system for rotating said endless track on said track support structure.

2. The bovine exercise device of claim 1 which includes an energy recapture system, in which energy from the walking motion of an animal would be recaptured by an energy recovery system.

3. The bovine exercise device of claim 1 in which said drive system for rotating said endless track is a motor.

4. The bovine exercise device of claim 1 in which said drive system utilizes the walking motion of the animal to power the endless track.

5. The bovine exercise device of claim 1 which includes an electrical generating system for deriving electricity from the walking motion of the animal.

6. The bovine exercise device of claim 1, which further comprises an animal identification system, for identifying individual animals.

7. The bovine exercise device of claim 6, in which said animal identification system comprises an electronic device.

8. The bovine exercise device of claim 7, which further comprises a database with data on cows that use said bovine exercise device.

9. The bovine exercise device of claim 6 which further comprises ID chips carried by the animals that use said bovine exercise device, in which said chips carry specific information about the animal that carries them.

10. The bovine exercise device of claim 6 which further comprises destination information contained in the identification system about the animal's destination.

11. The bovine exercise device of claim 10 which further comprises a system of gates that direct the animal to a specific destination upon leaving said bovine exercise device.

* * * * *